United States Patent
Bastian et al.

(10) Patent No.: US 10,553,023 B2
(45) Date of Patent: Feb. 4, 2020

(54) SYSTEM AND METHOD FOR DETERMINING ALPHA VALUES FOR ALPHA SHAPES

(71) Applicant: SAP SE, Walldorf (DE)

(72) Inventors: Kai-Niklas Bastian, Malsch (DE); Hinnerk Gildhoff, Neckargemünd (DE); Tim Grouisborn, Mannheim (DE); Michael Jung, Angelbachtal (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 15/944,520

(22) Filed: Apr. 3, 2018

(65) Prior Publication Data
US 2019/0304176 A1    Oct. 3, 2019

(51) Int. Cl.
  *G06T 17/10*   (2006.01)
  *G06T 17/20*   (2006.01)
  *G06F 7/08*    (2006.01)

(52) U.S. Cl.
  CPC ............... *G06T 17/10* (2013.01); *G06F 7/08* (2013.01); *G06T 17/20* (2013.01); *G06T 2210/56* (2013.01)

(58) Field of Classification Search
  CPC .................................................. G06T 17/20
  See application file for complete search history.

(56) References Cited

U.S. PATENT DOCUMENTS 6,119,069 A * 9/2000 McCauley ............... G06K 9/48
                                                                702/5
2005/0140678 A1 * 6/2005 Gielis ..................... G06T 17/00
                                                              345/441
2013/0173222 A1 * 7/2013 Voth ....................... G16H 50/50
                                                                703/1

OTHER PUBLICATIONS

Bernardini, Fausto, et al. "Automatic reconstruction of 3D CAD models from digital scans." International Journal of Computational Geometry & Applications 9.04n05 (1999): 327-369. (Year: 1999).*
Fischer, Kaspar. "Introduction to alpha shapes." Department of Information and Computing Sciences, Faculty of Science, Utrecht University 17 (2000). (Year: 2000).*
Melkemi, Mahmoud. "A-shapes of a finite point set." Proceedings of the thirteenth annual symposium on Computational geometry. ACM, 1997. (Year: 1997).*
Teichmann, Marek, and Michael Capps. "Surface reconstruction with anisotropic density-scaled alpha shapes." Proceedings Visualization'98 (Cat. No. 98CB36276). IEEE, 1998. (Year: 1998).*
Van de Weygaert, Rien, et al. "Alpha shape topology of the cosmic web." 2010 International Symposium on Voronoi Diagrams in Science and Engineering. IEEE, 2010. (Year: 2010).*
Xu, Xiaolong, and Koichi Harada. "Automatic surface reconstruction with alpha-shape method." The visual computer 19.7-8 (2003): 431-443. (Year: 2003).*

* cited by examiner

*Primary Examiner* — Ryan McCulley
(74) *Attorney, Agent, or Firm* — Lam P. Doan; Fountainhead Law. Group P.C.

(57) ABSTRACT

Some embodiments provide a non-transitory machine-readable medium that stores a program. The program receives, from a client device, a percentage value for a set of points. The program further determines a triangulation based on the set of points. The program also determines an alpha value based on the triangulation and the percentage value. The program further determines an alpha shape based on the alpha value. The program also provides the client device the alpha shape.

20 Claims, 13 Drawing Sheets

SYSTEM AND METHOD FOR DETERMINING ALPHA VALUES FOR ALPHA SHAPES

BACKGROUND

For many computer-related technologies (e.g., computer-aided engineering (CAE), computational geometry, computer-aided design (CAD), computer vision, geographical information systems (GIS), robotics, etc.), it may be useful to determine a region that describes the space occupied by a set of points (two-dimensional (2D) points, three-dimensional (3D) points, etc.). Different techniques may be used to determine different such regions. For example, one technique may determine a convex hull as the region occupied by the set of points. Another technique may determine an alpha shape as the region occupied by the set of points. Other techniques are possible.

SUMMARY

In some embodiments, a non-transitory machine-readable medium stores a program executable by at least one processing unit of a device. The program receives, from a client device, a percentage value for a set of points. The program further determines a triangulation based on the set of points. The program also determines an alpha value based on the triangulation and the percentage value. The program further determines an alpha shape based on the alpha value. The program also provides the client device the alpha shape.

In some embodiments, determining the alpha value may include determining a list of edges that includes each edge in the triangulation, determining a length for each edge in the list of edges and sorting the list of edges from shortest length to longest length. Determining the alpha value may further include calculating a value based on the percentage value and a total number of edges in the list of edges, identifying an edge in the list of edges having an nth shortest length, wherein n equals the value, and determining the alpha value by dividing the length of the identified edge by a defined value. Calculating the value may include determining an integer closest to the product of the percentage value and the total number of edges in the list of edges.

In some embodiments, determining the alpha value may include determining a list of triangles that includes each triangle in the triangulation, determining an area for each triangle in the list of triangles, determining a circumcircle for each triangle in the list of triangles, determining a radius of the circumcircle for each triangle in the list of triangles and sorting the list of triangles from shortest radius to longest radius. Determining the alpha shape value may further include determining a total area of the triangles in the list of triangles, calculating a value based on the percentage value and the total area and determining the alpha value by iterating through the list of triangles from shortest radius to longest radius; while iterating through the list of triangles, adding the area of each triangle to an aggregate area value until the aggregate area value is greater than or equal to the value; and selecting the radius of the last triangle whose area is added to the aggregate area value as the alpha value.

In some embodiments, determining the alpha shape based on the alpha value may include generating a circle having a radius equal to the alpha value. Determining the alpha shape based on the alpha value may also include iterating through each pair of points in the set of points to identify a set of edges configured to define the alpha shape by including in the set of edges each edge formed by a pair of points in the set of points where the circle can be positioned to touch the pair of points without the circle enclosing any other points in the set of points.

In some embodiments, a method for a device receives, from a client device, a percentage value for a set of points. The method further determines a triangulation based on the set of points. The method also determines an alpha value based on the triangulation and the percentage value. The method further determines an alpha shape based on the alpha value. The method also provides the client device the alpha shape.

In some embodiments, determining the alpha value may include determining a list of edges that includes each edge in the triangulation, determining a length for each edge in the list of edges, and sorting the list of edges from shortest length to longest length. Determining the alpha value may further include calculating a value based on the percentage value and a total number of edges in the list of edges, identifying an edge in the list of edges having an nth shortest length, wherein n equals the value, and determining the alpha value by dividing the length of the identified edge by a defined value. Calculating the value may include determining an integer closest to the product of the percentage value and the total number of edges in the list of edges.

In some embodiments, determining the alpha value may include determining a list of triangles that includes each triangle in the triangulation, determining an area for each triangle in the list of triangles, determining a circumcircle for each triangle in the list of triangles, determining a radius of the circumcircle for each triangle in the list of triangles and sorting the list of triangles from shortest radius to longest radius. Determining the alpha shape value may further include determining a total area of the triangles in the list of triangles, calculating a value based on the percentage value and the total area; and determining the alpha value by iterating through the list of triangles from shortest radius to longest radius; while iterating through the list of triangles, adding the area of each triangle to an aggregate area value until the aggregate area value is greater than or equal to the value; and selecting the radius of the last triangle whose area is added to the aggregate area value as the alpha value.

In some embodiments, determining the alpha shape based on the alpha value may include generating a circle having a radius equal to the alpha value. Determining the alpha shape based on the alpha value may also include iterating through each pair of points in the set of points to identify a set of edges configured to define the alpha shape by including in the set of edges each edge formed by a pair of points in the set of points where the circle can be positioned to touch the pair of points without the circle enclosing any other points in the set of points.

In some embodiments, a system includes a set of processing units and a non-transitory machine-readable medium that stores instructions. The instructions cause at least one processing unit to receive, from a client device, a percentage value for a set of points. The instructions further cause the at least one processing unit to determine a triangulation based on the set of points. The instructions also cause the at least one processing unit to determine an alpha value based on the triangulation and the percentage value. The instructions further cause the at least one processing unit to determine an alpha shape based on the alpha value. The instructions also cause the at least one processing unit to provide the client device the alpha shape.

In some embodiments, determining the alpha value may include determining a list of edges that includes each edge in the triangulation, determining a length for each edge in the list of edges, and sorting the list of edges from shortest length to longest length. Determining the alpha value may further include calculating a value based on the percentage value and a total number of edges in the list of edges, identifying an edge in the list of edges having an nth shortest length, wherein n equals the value, and determining the alpha value by dividing the length of the identified edge by a defined value. Calculating the value may include determining an integer closest to the product of the percentage value and the total number of edges in the list of edges.

In some embodiments, determining the alpha value may include determining a list of triangles that includes each triangle in the triangulation, determining an area for each triangle in the list of triangles, determining a circumcircle for each triangle in the list of triangles, determining a radius of the circumcircle for each triangle in the list of triangles, and sorting the list of triangles from shortest radius to longest radius. Determining the alpha shape value may further include determining a total area of the triangles in the list of triangles, calculating a value based on the percentage value and the total area, and determining the alpha value by iterating through the list of triangles from shortest radius to longest radius; while iterating through the list of triangles, adding the area of each triangle to an aggregate area value until the aggregate area value is greater than or equal to the value; and selecting the radius of the last triangle whose area is added to the aggregate area value as the alpha value.

The following detailed description and accompanying drawings provide a better understanding of the nature and advantages of the present invention.

DETAILED DESCRIPTION

Figure 1:
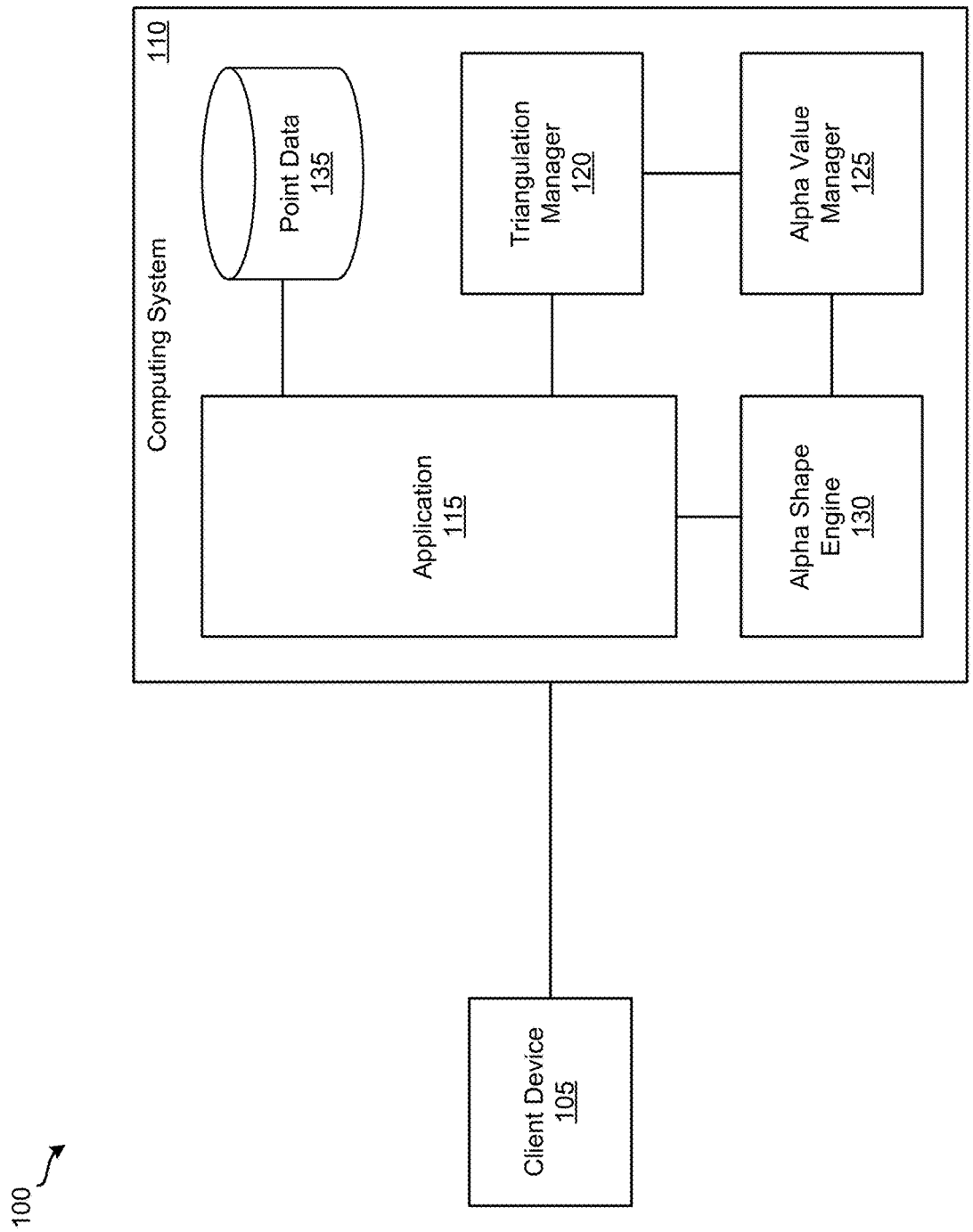
FIG. 1 illustrates a system for determining alpha shapes according to some embodiments.

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Described herein are techniques for determining alpha shapes. In some embodiments, a system may determine alpha shapes for client devices in communication with the system. For example, the system may receive input from a client device specifying a percentage value (e.g., a value between 0%-100%) for a set of points. The system can use the percentage value to determine an alpha value for an alpha shape formed from the set of points. In technique, the system determines an alpha value based on the percentage value and edges of a triangulation based on the set of points. In another technique, the system determines an alpha value based on the percentage value and areas of triangles in the triangulation based on the set of points. In yet another technique, the system does not receive any input from a client device. Rather, the system receives a request from the client device for an alpha shape formed from a set of points. In response, the system automatically determines a percentage value for the set of points. In some embodiments, the system determines an alpha value based on the percentage value and edges of a triangulation based on the set of points. In other embodiments, the system determines an alpha value based on the percentage value and areas of triangles in the triangulation based on the set of points.

The techniques described in the present application provide a number of benefits and advantages over conventional alpha shape methodologies. First, using a percentage value (e.g., received from a client device, automatically calculated, etc.) and edges or areas of triangles in a triangulation of a set of points to determine an alpha value for an alpha shape formed from the set of points yields more predictable results. For example, a first alpha shape determined for a first set of points using one of the techniques may be visually the same as a second alpha shape determined, using the same technique and percentage value, for a second set of points that are a scaled version of the first set of points (e.g., multiplying each point in the first set of points by a number (e.g., 10, 50, 100, etc.)).

Second, the same criterion (e.g., percentage of area of triangles, percentage of number of edges, etc.) may be used for different point sets. If the same percentage value is used to determine an alpha shape for each of the different sets of points, the resulting alpha shapes for the different sets of points can have a predictably similar alpha shape. Referring to the same example above, determining the first alpha shape for the first set of points and the second alpha shape for the second set of points using the same percentage value and technique will produce alpha shapes that are the same shape. In contrast, using the same alpha value (i.e., the same criterion) to determine alpha shapes for the first set of points and the second set of points will produce alpha shapes that are not the same shape.

Third, using the techniques explained in the present application also utilizes less memory and yields faster processing on client devices. For instance, a web browser operating on a client device may not be able to render or display a large set of points but the web browser can render and display a polygon that is defined by a subset of the large set of points and that encompasses the large set of points.

FIG. 1 illustrates a system 100 for determining alpha shapes according to some embodiments. As shown, system 100 includes client device 105 and computing system 110. While FIG. 1 includes one client device 105, one of ordinary skill in the art will appreciate that any number of additional client devices configured similarly to client device 105 may be included in system 100. Client device 105 is configured to communicate and interact with computing system 110. For example, a user of client device 105 may send computing system 110 a request for an alpha shape for a set of points along with a percentage value (e.g., a value between 0%-100%). In response, client device 105 may receive from computing system 110 an alpha shape formed from the set of points and present the alpha shape for viewing (e.g., on a display of the client device). In some instances, a user of client device 105 sends computing system 110 only a request for an alpha shape for a set of points. In response to such a request, client device 105 can receive from computing system 110 an alpha shape formed from the set of points and present the alpha shape for viewing (e.g., on a display of the client device).

As illustrated in FIG. 1, computing system 110 includes application 115, triangulation manager 120, alpha value manager 125, alpha shape engine 130, and point data storage 135. In some embodiments, a database management system (DBMS) provides access to and interacts with point data storage 135. In some such embodiments, triangulation manager 120, alpha value manager 125, and alpha shape engine 130 are components implemented as part of the DBMS.

Point data storage 135 is configured to stores sets of point data. In some embodiments, an instance of point data specifies a location in a defined space (e.g., a Euclidean space). The point data may specify a location in a defined space using any number of different coordinate systems (e.g., a Cartesian coordinate system, a polar coordinate system, a spherical polar coordinate system, a cylindrical polar coordinate system, a geographical coordinate system, etc.). Each set of point data may include other data associated with the point data, metadata describing the point data, etc. In some embodiments, point data storage 135 is implemented in a single physical storage while, in other embodiments, point data storage 135 may be implemented across several physical storages. While FIG. 1 shows point data storage 135 as part of computing system 110, one of ordinary skill in the art will appreciate that point data storage 135 may be external to computing system 110 in some embodiments.

Application 115 is configured to communicate and interact with client device 105. For instance, application 115 may receive from client device 105 a request for an alpha shape formed by a set of points and a percentage value. In response, application 115 can retrieve the set of points from point data storage 135 and send triangulation manager 120 the set of points, the percentage value, and a request to start processing the set of points. Once the set of points are processed, application 115 may receive an alpha shape from alpha shape engine 130, which application 115 forwards to client device 105. In some cases, application 115 may receive from client device 105 only a request for an alpha shape formed by a set of points. In response to such a request, application 115 may retrieve the set of points from point data storage 135 and send triangulation manager 120 the set of points along with a request to start processing the set of points. After the set of points are processed, application 115 can receive an alpha shape from alpha shape engine 130, which application 115 forwards to client device 105. Application 115 may be any number of different types of applications. For instance, application 115 may be an analytics application, a data management application, a database management application, a human capital management application, an enterprise management application, a customer relationship management application, a financial management application, etc.

Triangulation manager 120 is responsible for generating triangulations for sets of points. For example, triangulation manager 120 may receive from application 115 a set of points, a percentage value, and a request to start processing the set of points. In response, triangulation manager 120 generates a triangulation based on the set of points. The triangulation that triangulation manager 120 generates can be a Delaunay triangulation. In some embodiments, a Delaunay triangulation is a triangulation in which, for each triangle in the Delaunay triangulation, none of the points in the set of points are inside the circumcircle of the triangle. Next, triangulation manager 120 sends alpha value manager 125 the set of points, the generated triangulation of the set of points, and the percentage value for further processing. In some instances, triangulation manager 120 may not receive a percentage value from application 115. In such instances, triangulation manager 120 sends only the set of points and the generated triangulation of the set of points to alpha value manager 125 for further processing.

Alpha value manager 125 may be configured to generate alpha values for sets of points based on triangulations of the sets of points. For instance, alpha value manager 125 can receive from triangulation manager 120 a set of points, a triangulation of the set of points, and a percentage value. Alpha value manager 125 may determine an alpha value for the set of points using different methodologies. In some cases, alpha value manager 125 can determine an alpha value for the set of points based on edges of the triangulation and the percentage value. In some such cases, alpha value manager 125 determines a list of edges that includes each edge in the triangulation of the set of points. Next, alpha value manager 125 determines a length for each edge in the list of edges. Alpha value manage 125 then sorts the list of edges from shortest length to longest length. Next, alpha value manager 125 calculates a value (also referred to as an edge length rank value) based on the percentage value and the total number of edges in the list of edges. In some embodiments, alpha value manager 125 calculates the edge length rank value by determining the integer closest to the product of the percentage value and the total number of edges in the list of edges. After calculating the edge length rank value, alpha value manager 125 may identify the edge in the sorted list of edges having the nth shortest length, where n equals the edge length rank value. Then, alpha manager 125 determines the alpha value for the set of points by dividing the length of the identified edge by a defined value (e.g., two, four, five, etc.). Once the alpha value is determined, alpha value manager 125 sends the alpha value and the set of points to alpha shape engine 130 for further processing.

In other cases, alpha value manager 125 may determine an alpha value for the set of points based on areas of triangles in the triangulation and the percentage value. In some such other cases, alpha value manager 125 determines a list of triangles that includes each triangle in the triangulation of the set of points. Alpha value manager 125 then determines the area of each triangle in the list of triangles. Alpha value manage 125 also determines the circumcircle of each triangle in the list of triangles as well as the radius of each circumcircle. Next, alpha value manager 125 sorts the list of triangles from shortest circumcircle radius to longest circumcircle radius. Then, alpha value manager 125 determines the total area of all the triangles in the list of triangles and calculates a value (also referred to as an area threshold value) based on the percentage value and the total area of all the triangles in the list of triangles. In some embodiments, alpha value manager 125 calculates the area threshold value by multiplying the total area of all the triangles in the list of triangles by the percentage value. Once the area threshold value is calculated, alpha value manager 125 starts iterating through the list of triangles from shortest circumcircle radius to longest circumcircle radius. While iterating through the list of triangles, alpha value manager 125 adds the area of each triangle to an aggregate area value until the aggregate area value is greater than or equal to the area threshold value. Then, alpha value manager 125 determines the alpha value for the set of points by selecting the circumcircle radius of the last triangle whose area is added to the aggregate area value as the alpha value. After the alpha value is determined, alpha value manager 125 sends the alpha value and the set of points to alpha shape engine 130 for further processing.

In some instances, alpha value manager 125 may receive from triangulation manager 120 only a set of points and a triangulation of the set of points. In some such instances, alpha value manager 125 automatically determines a percentage value based on the number of points in the set of points. In some embodiments, alpha value manager 125 determines the percentage value using the following equation:

$$V_P = 1 - \left(\frac{\sqrt{P_N}}{P_N}\right)$$

where $V_P$ is the percentage value and $P_N$ is the number of points in the set of points. Based on the determined percentage value, alpha value manager 125 determines the alpha value for the set of points using one of the methods described above (i.e., determining the alpha value based on edges of the triangulation and the determined percentage value or determining the alpha value based on areas of triangles in the triangulation and the determined percentage value). After determining the alpha value, alpha value manager 125 sends the alpha value and the set of points to alpha shape engine 130 for further processing.

Alpha shape engine 130 may handle the generation of alpha shapes for sets of points based on alpha values. For example, alpha shape engine 130 can receive a set of points and an alpha value for the set of points from alpha value manager 125. In response, alpha shape engine 130 generates an alpha shape formed from the set of points based on the alpha value. In some embodiments, alpha shape engine 130 generates an alpha shape for a set of points based on an alpha value by generating a circle (or a sphere for points in 3D space) having a radius equal to the alpha value. Then, alpha shape engine 130 generates based on the set of points a Delaunay triangulation, which is comprised of edges and triangles. For each triangle in the Delaunay triangulation, alpha shape engine 130 checks whether the circumcircle of the triangle is less than or equal to the generated circle. If so, the triangle is included in the alpha shape. Otherwise, it is excluded. Next, alpha shape engine 130 iterates through each edge in the Delaunay triangulation to identify edges to include in the alpha shape. If the generated circle can be positioned to touch the end points of an edge without the circle enclosing any other points in the set of points, the edge is included in the alpha shape. Otherwise, it is excluded. Upon generating the alpha shape for the set of points, alpha shape engine 130 sends the alpha shape to application 115.

Figure 2:
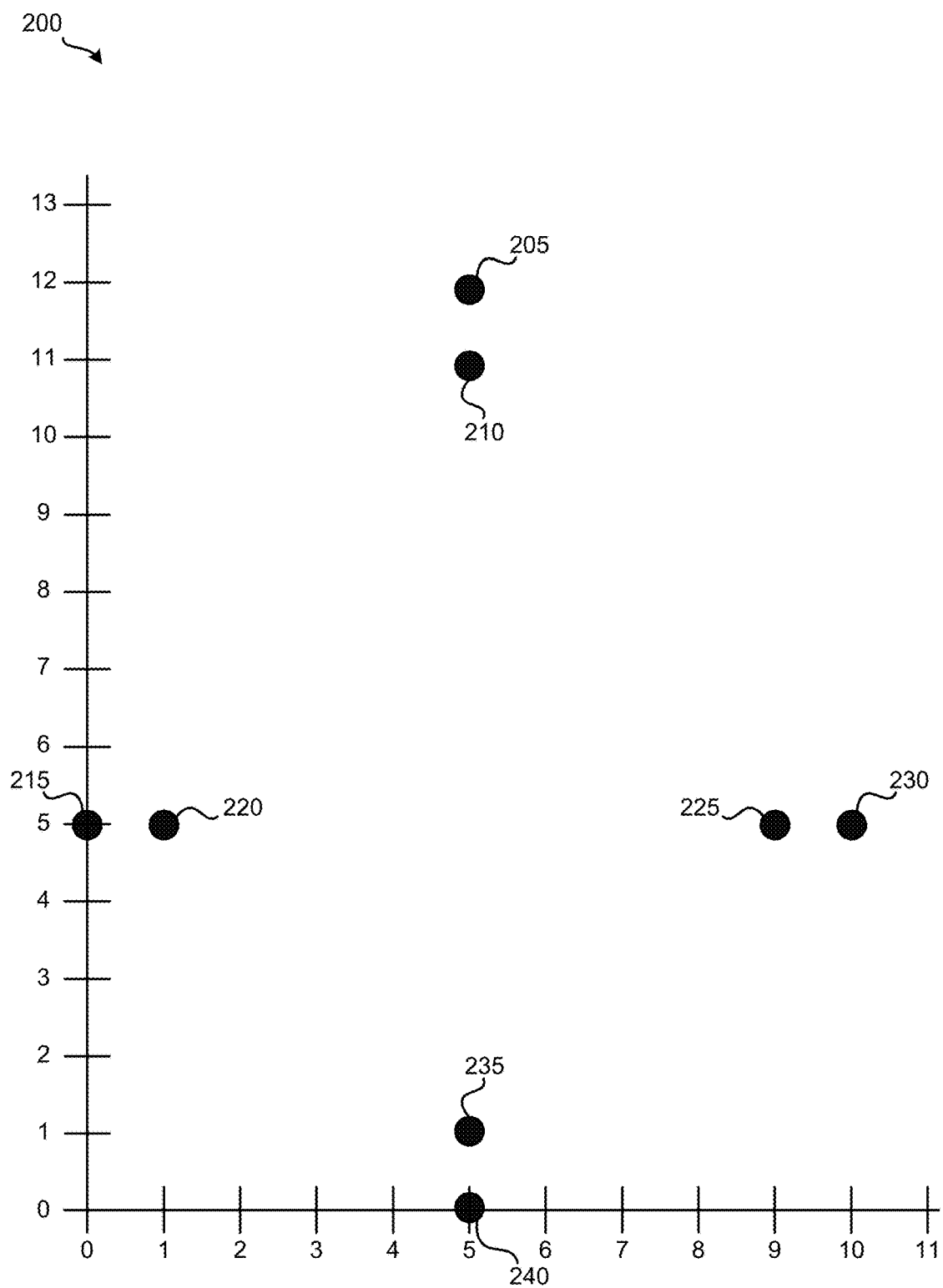
FIG. 2 illustrates an example set of points according to some embodiments.

An example operation of system 100 will now be described by reference to FIGS. 1-5. The example operation starts by client device 105 sending application 105 a request for an alpha shape for a set of points and a percentage value of 0.9 (i.e., 90%). FIG. 2 illustrates an example set of points 200 according to some embodiments. For this example, client device 105 sends application 115 a request for an alpha shape for the set of points 200. As shown, the set of points 200 includes eight points 205-240 positioned in a 2D Cartesian coordinate system. Specifically, point 205 is positioned at (5, 12), point 210, is positioned at (5, 11), point 215 is positioned at (0, 5), point 220 is positioned at (1, 5), point 225 is positioned at (9, 5), point 230 is positioned at (10, 5), point 235 is positioned at (5, 1), and point 240 is positioned at (5, 0).

Figure 3:
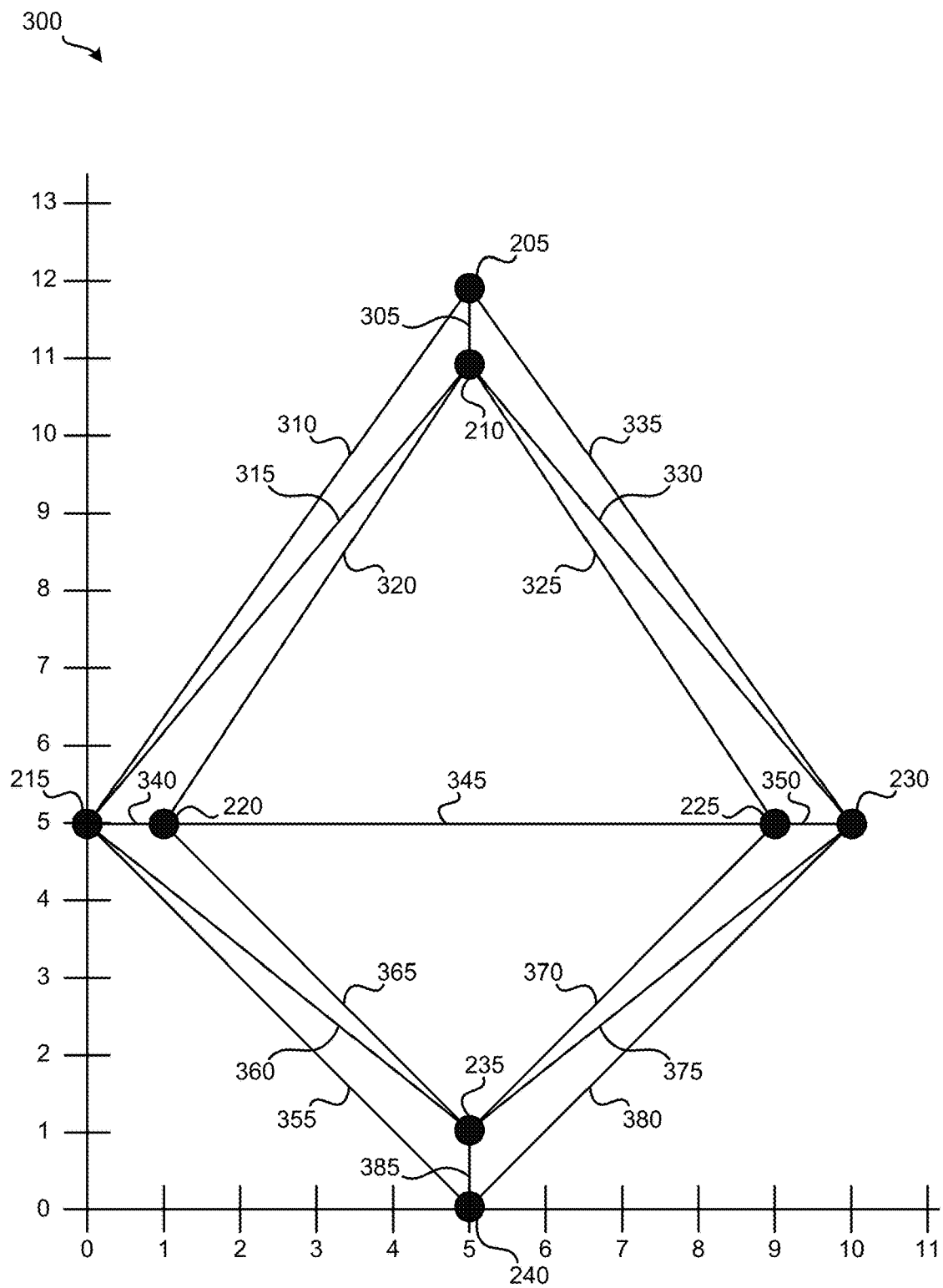
FIG. 3 illustrates a triangulation of the set of points illustrated in FIG. 2 according to some embodiments.

Once application 115 receives the request and the percentage value, application 1150 retrieves the set of points 200 from point data storage 135 and sends triangulation manager 120 the set of points, the percentage value, and a request to start processing the set of points. When triangulation manager 120 receives the set of points, the percentage value, and the request from application 115, triangulation manager 120 generates a triangulation based on the set of points. FIG. 3 illustrates a triangulation 300 of the set of points illustrated in FIG. 2 according to some embodiments. In this example, triangulation 300 is a Delaunay triangulation of the set of points 200. Triangulation manager 120 then sends alpha value manager 125 the set of points 200, the generated triangulation 300 of the set of points 200, and the percentage value of 0.9 for further processing.

Figure 4A:
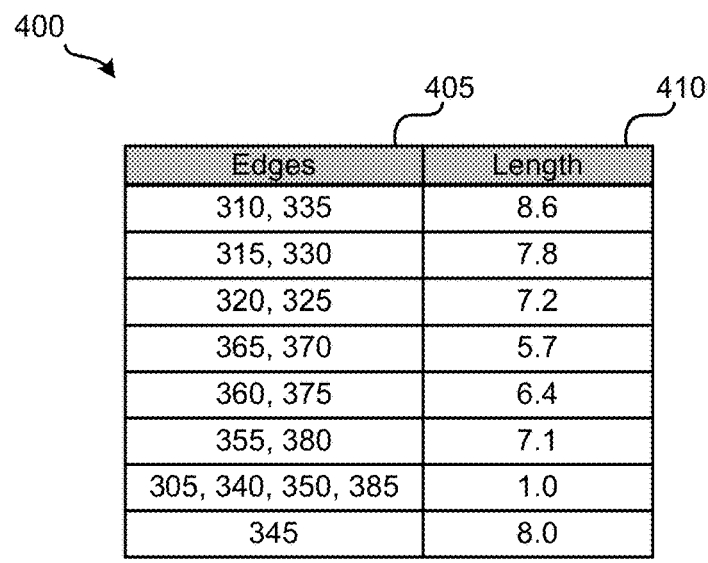
FIGS. 4A and 4B illustrate a table of edges of the triangulation illustrated in FIG. 3 according to some embodiments.
Figure 4B:
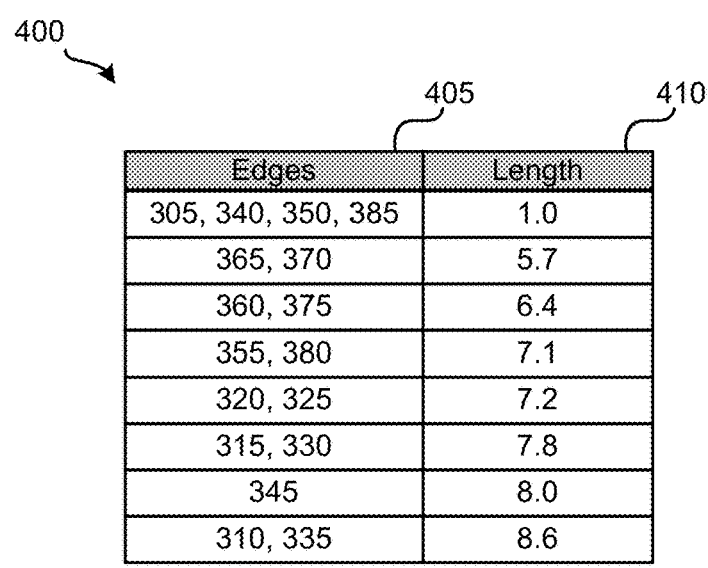

After alpha value manager 125 receives the set of points 200, the triangulation 300 of the set of points 200, and the percentage value of 0.9, alpha value manager 125 determine an alpha value for the set of points 200. For this example, alpha value manager 125 determines the alpha value for the set of points 200 based on edges of the triangulation 300 and the percentage value of 0.9. First, alpha value manager 125 determines a list of edges that includes each edge in the triangulation 300 of the set of points 200. FIG. 4A illustrates a table 400 of edges of the triangulation 300 illustrated in FIG. 3 according to some embodiments. As shown, column 405 of table 400 includes each of the edges 305-385 in triangulation 300. Then, alpha value manager 125 determines a length for each edge in the list of edges. Referring to FIG. 4A, column 410 of table 400 includes the corresponding lengths of the edges in 305-385. Alpha value manage 125 then sorts the list of edges from shortest length to longest length. FIG. 4B illustrates table 400 after alpha value manager 125 sorts the edges illustrated in table 400 of FIG. 4A from shortest length to longest length.

Next, alpha value manager 125 calculates an edge length rank value based on the percentage value of 0.9 and the total number of edges in the list of edges (17 edges in this example) by determining the integer closest to the product of the percentage value of 0.9 and the total number of edges in the list of edges. For this example, alpha value manager 125 calculates the edge length rank value to be 15 (i.e., the integer closest to 15.3). Once the edge length rank value is calculated, alpha value manager 125 identifies the edge in the sorted list of edges having the nth shortest length, where n equals the edge length rank value. In this example, alpha value manager 125 identifies edge 345 as the 15th shortest edge in the list of edges illustrated in table 400 of FIG. 4B. Then, alpha value manager 125 determines the alpha value for the set of points 200 by dividing the length of the edge 345 (a length of 8.0 in this example) a defined value of two. Thus, alpha value manager 125 determines the alpha value for the set of points 200 as 4.0 for this example. Upon determining the alpha value, alpha value manager 125 sends the alpha value of 4.0 and the set of points 200 to alpha shape engine 130 for further processing.

Figure 5:
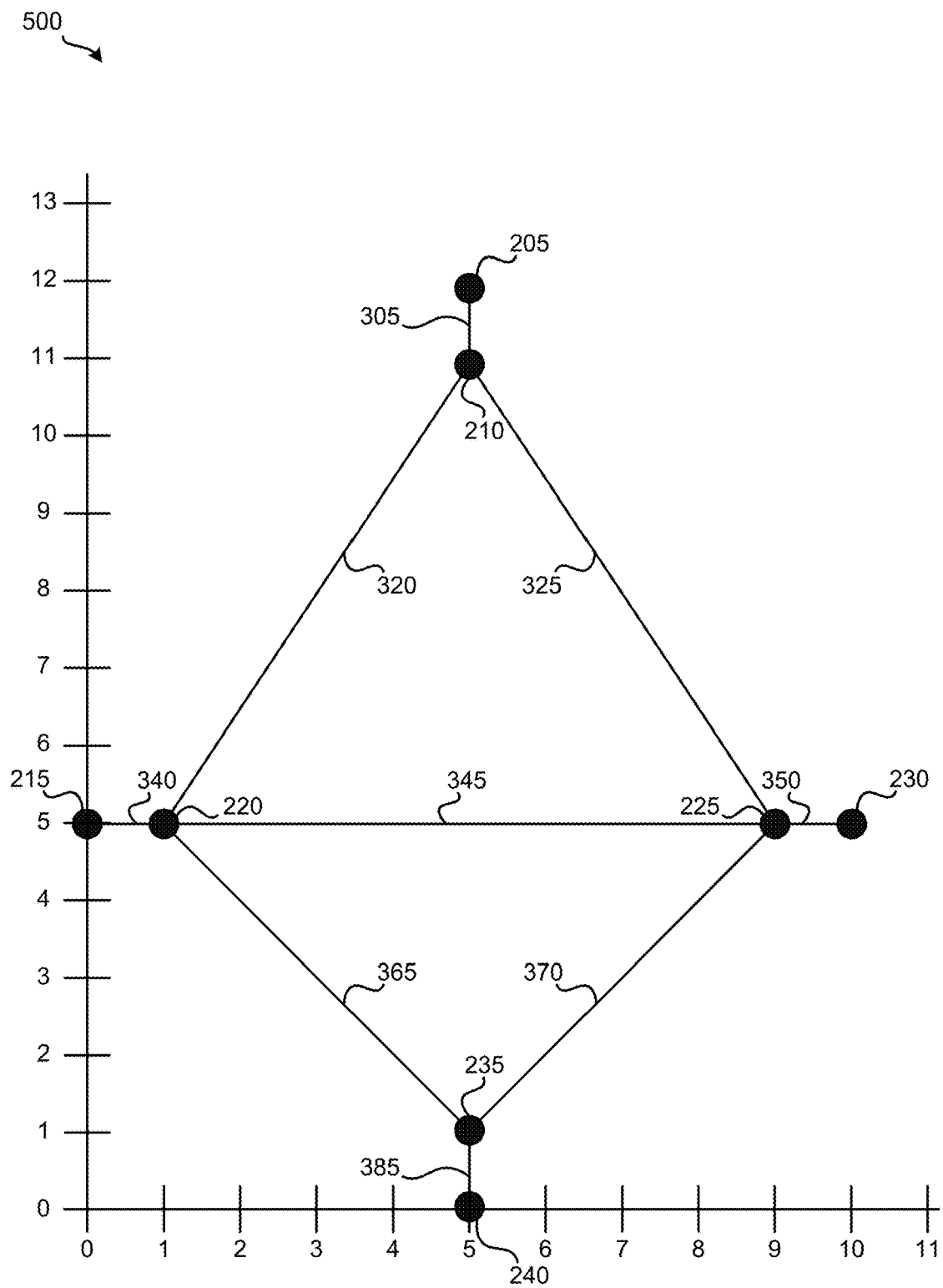
FIG. 5 illustrates an example alpha shape formed from the set of points illustrated in FIG. 2 according to some embodiments.

When alpha shape engine 130 receives the set of points 200 and the alpha value of 4.0 for the set of points 200 from alpha value manager 125, alpha shape engine 130 generates an alpha shape formed from the set of points 200 based on the alpha value. FIG. 5 illustrates an example alpha shape 500 formed from the set of points illustrated in FIG. 2 according to some embodiments. In particular, alpha shape 500 is the alpha shape that alpha shape engine 130 generated using the set of points 200 and the alpha value of 4.0. As shown, alpha shape 500 is formed by points 205-240 and edges 305, 320, 325, 340-350, 365, 370, and 385.

Another example operation of system 100 will now be described by reference to FIGS. 1-3 and 6-8. The example operation starts by client device 105 sending application 105 a request for an alpha shape for the set of points 200 and a percentage value of 0.60 (i.e., 60%). When application 115 receives the request and the percentage value, application 1150 retrieves the set of points 200 from point data storage 135 and sends triangulation manager 120 the set of points, the percentage value, and a request to start processing the set of points. Upon receiving the set of points, the percentage value, and the request from application 115, triangulation manager 120 generates the triangulation 300 based on the set of points 200. Then, triangulation manager 120 sends alpha value manager 125 the set of points 200, the generated triangulation 300 of the set of points 200, and the percentage value of 0.60 for further processing.

Figure 6:
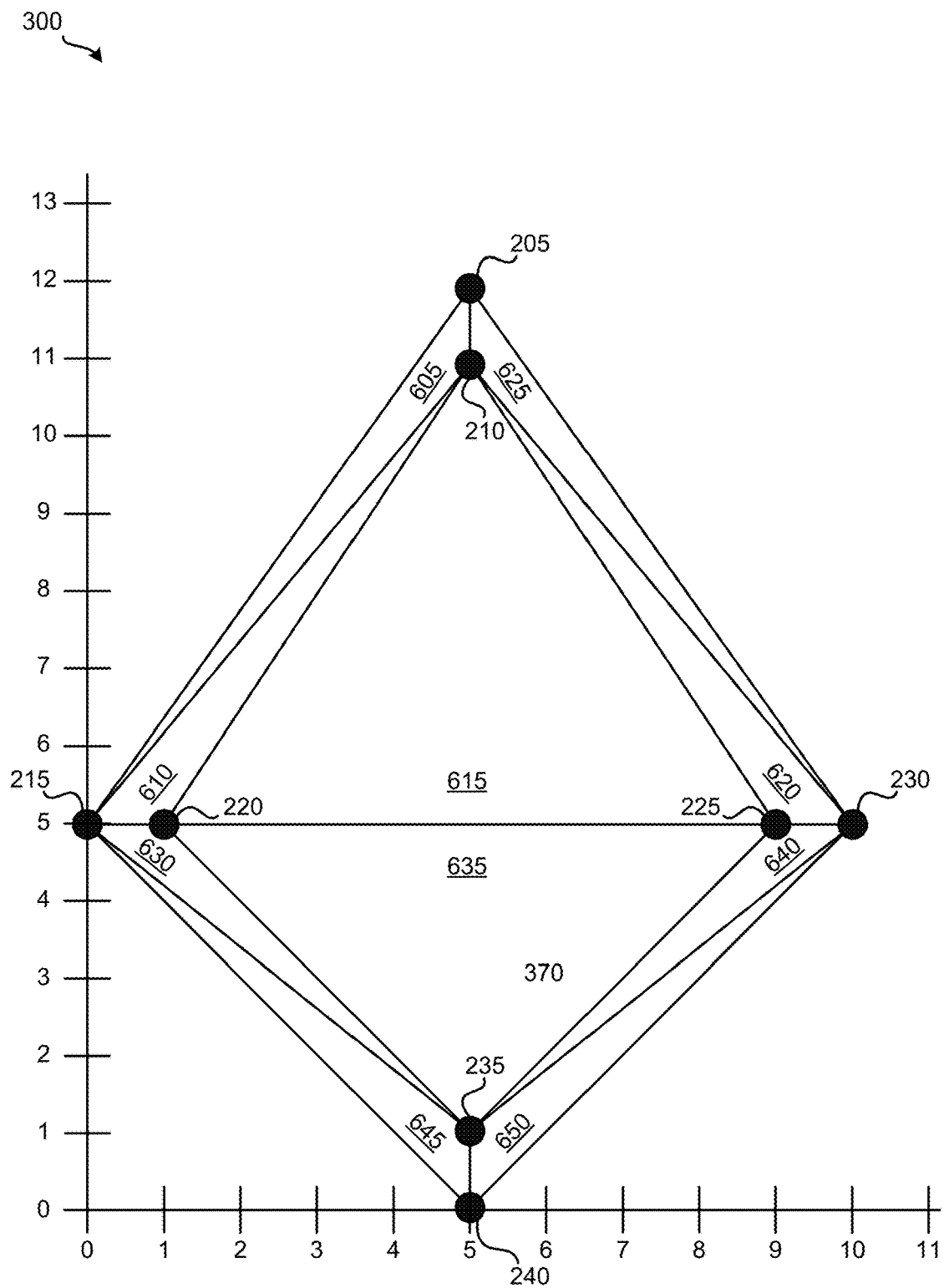
FIG. 6 illustrates triangles of the triangulation illustrated in FIG. 3 according to some embodiments.
Figure 7A:
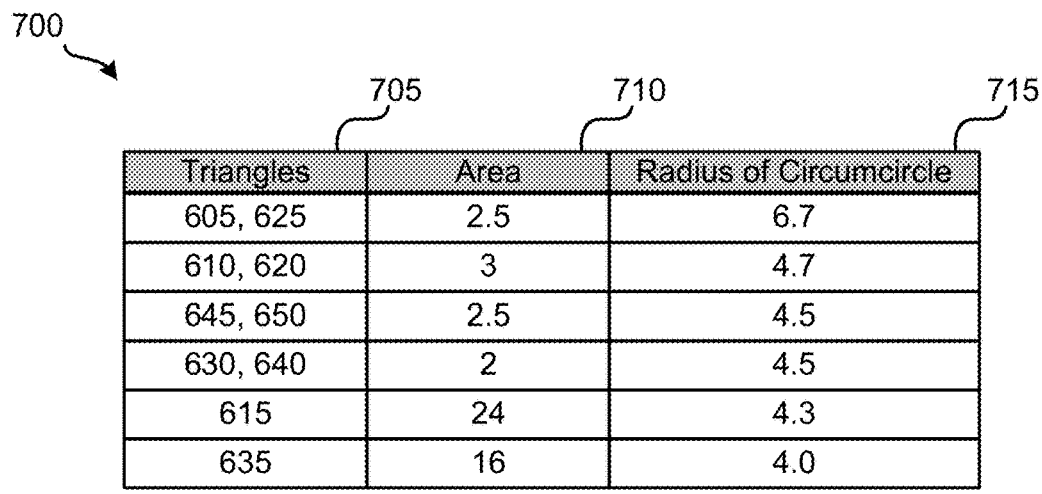
FIGS. 7A and 7B illustrate a table of triangles of the triangulation illustrated in FIG. 6 according to some embodiments.

Once alpha value manager 125 receives the set of points 200, the triangulation 300 of the set of points 200, and the percentage value of 0.60, alpha value manager 125 determine an alpha value for the set of points 200. In this example, alpha value manager 125 determines the alpha value for the set of points 200 based on areas of triangles in the triangulation 300 and the percentage value of 0.60. In order to determine the alpha value for the set of points 200 for this example, alpha value manager 125 determines a list of triangles that includes each triangle in the triangulation 300 of the set of points 200. FIG. 6 illustrates triangles of the triangulation 300 illustrated in FIG. 3 according to some embodiments. As shown, triangulation 300 in FIG. 6 includes triangles 605-650. FIG. 7A illustrates a table 700 of triangles of the triangulation 300 illustrated in FIG. 3 according to some embodiments. As illustrated, column 705 of table 700 includes each of the triangles 605-650 in triangulation 300. Next, alpha value manager 125 determines the area of each triangle in the list of triangles. Referring to FIG. 7A, column 710 of table 700 includes the corresponding areas of the triangles in 605-650. Alpha value manager 125 then determines the circumcircle of each triangle in the list of triangles as well as the radius of each circumcircle. Referring to FIG. 7A, column 715 includes the radius of the corresponding circumcircle of the triangles 605-650.

Figure 7B:
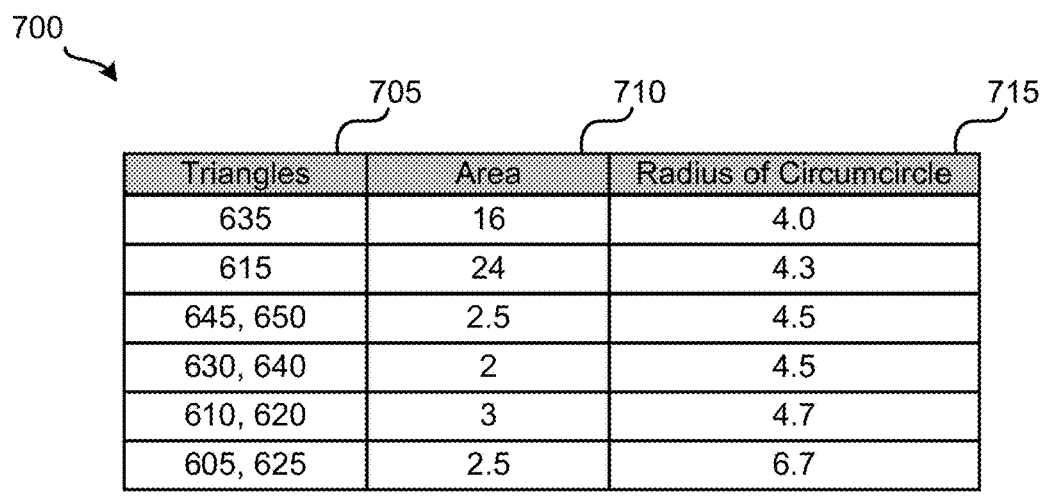

Next, alpha value manager 125 sorts the list of triangles from shortest circumcircle radius to longest circumcircle radius. FIG. 7B illustrates table 700 after alpha value manager 125 sorts the triangles illustrated in table 700 of FIG. 7A from shortest circumcircle radius to longest circumcircle radius. Then, alpha value manager 125 determines the total area of all the triangles in the list of triangles and calculates an area threshold value based on the percentage value and the total area of all the triangles in the list of triangles. In this example, alpha value manager 125 determines the total area of the triangles 605-650 is 60 and calculates the area threshold value by multiplying the total area of 60 by the percentage value of 0.60, resulting in an area threshold value of 36.

Upon calculating the area threshold value, alpha value manager 125 starts iterating through the list of triangles from shortest circumcircle radius to longest circumcircle radius. While iterating through the list of triangles, alpha value manager 125 adds the area of each triangle to an aggregate area value until the aggregate area value is greater than or equal to the area threshold value. Then, alpha value manager 125 determines the alpha value for the set of points by selecting the circumcircle radius of the last triangle whose area is added to the aggregate area value as the alpha value. For this example, alpha value manager 125 iterates through the list of sorted triangles shown in FIG. 7B starting at triangle 636 and stops iterating through the sorted list of triangles after alpha value manager 125 adds the area of triangle 615 (24 in this example) to the aggregate area value (16 in this example) since, the addition of the area of triangle 615 causes the aggregate area value increase from 16 to 40, which is now greater than the area threshold value of 36. Accordingly, alpha value manager 125 selects the circumcircle radius of the triangle 615 (4.3 for this example) as the alpha value. Then, alpha value manager 125 sends the alpha value of 4.3 and the set of points 200 to alpha shape engine 130 for further processing.

Figure 8:
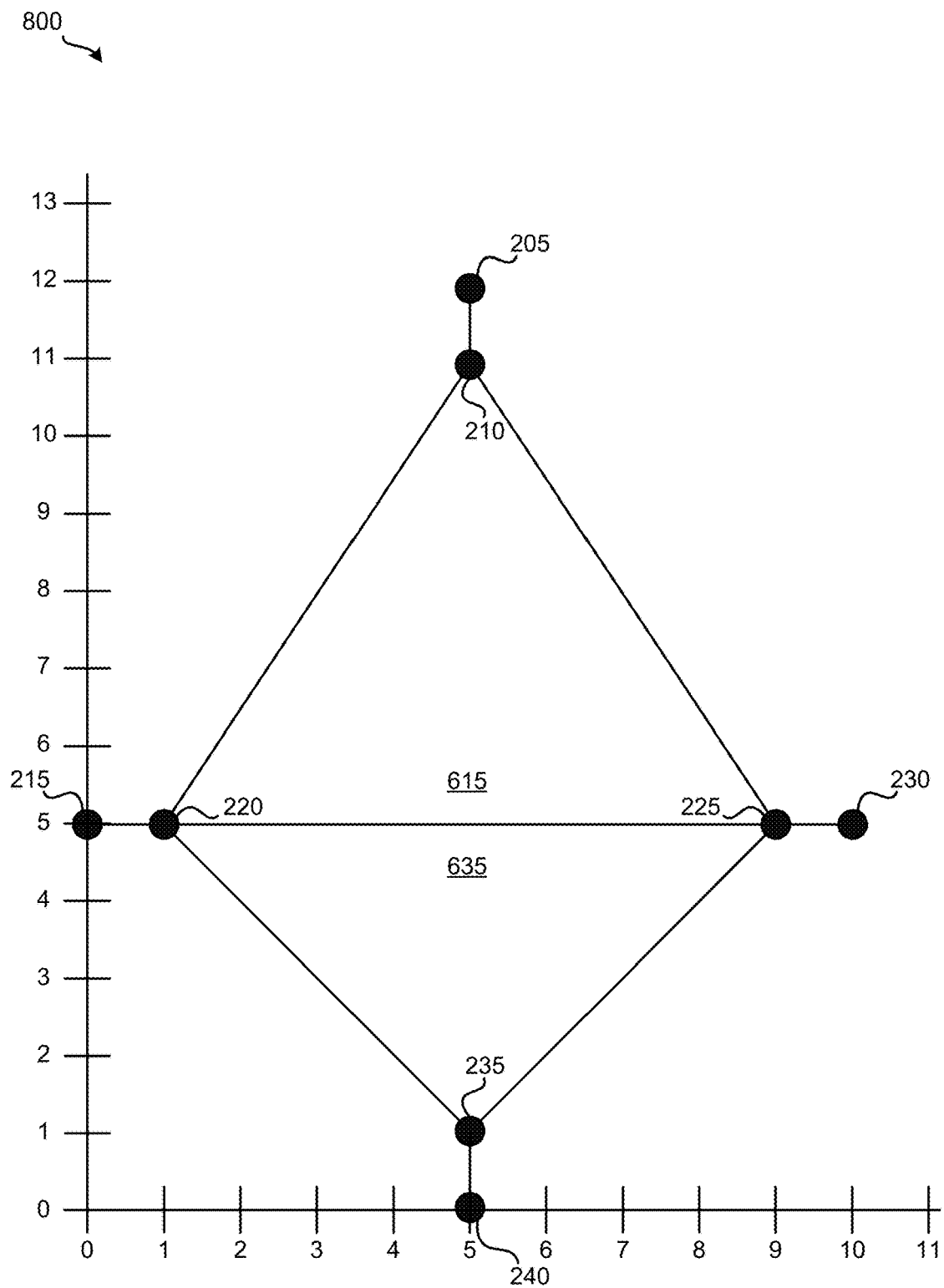
FIG. 8 illustrates an example alpha shape formed from the set of points illustrated in FIG. 2 according to some embodiments.

Once alpha shape engine 130 receives the set of points 200 and the alpha value of 4.3 for the set of points 200 from alpha value manager 125, alpha shape engine 130 generates an alpha shape formed from the set of points 200 based on the alpha value. FIG. 8 illustrates an example alpha shape 800 formed from the set of points illustrated in FIG. 2 according to some embodiments. Specifically, alpha shape 800 is the alpha shape that alpha shape engine 130 generated using the set of points 200 and the alpha value of 4.3. As illustrated, alpha shape 800 is formed by points 205-240 and triangles 615 and 635.

Yet another example operation of system 100 will now be described by reference to FIGS. 1-5 and 9. The example operation starts by client device 105 sending application 105 only a request for an alpha shape for the set of points 200. When application 115 receives the request, application 1150 retrieves the set of points 200 from point data storage 135 and sends triangulation manager 120 the set of points as well as a request to start processing the set of points. Once triangulation manager 120 receives the set of points and the request from application 115, triangulation manager 120 generates the triangulation 300 based on the set of points 200. Next, triangulation manager 120 sends alpha value manager 125 the set of points 200 and the generated triangulation 300 of the set of points 200 for further processing.

When alpha value manager 125 receives the set of points 200 and the triangulation 300 of the set of points 200, alpha value manager 125 determine an alpha value for the set of points 200. Since, for this example, alpha value manager 125 did not receive a percentage value, alpha value manager 125 automatically determines a percentage value using the equation provided above. In this example, alpha value manager 125 determines the percentage value to be 0.65 (0.646446 rounded to the nearest hundredth). Alpha value manager 125 then determines the alpha value for the set of points 200 using one of the methods described above (i.e., determining the alpha value based on edges of the triangulation and the determined percentage value or determining the alpha value based on areas of triangles in the triangulation and the determined percentage value). In this example, alpha value manager 125 uses the method for determining an alpha value based on edges of a triangulation of a set of points and a percentage value. As such, alpha value manager 125 determines the alpha value for the set of points 200 to be 3.6 (i.e., 17 total edges×0.65=11.05, the closest integer to 11.05 is 11, the edge having the 11th shortest length is edge 320, and the length of edge 320/2=3.6). Next, alpha value manager 125 sends the alpha value of 3.6 and the set of points 200 to alpha shape engine 130 for further processing.

Figure 9:
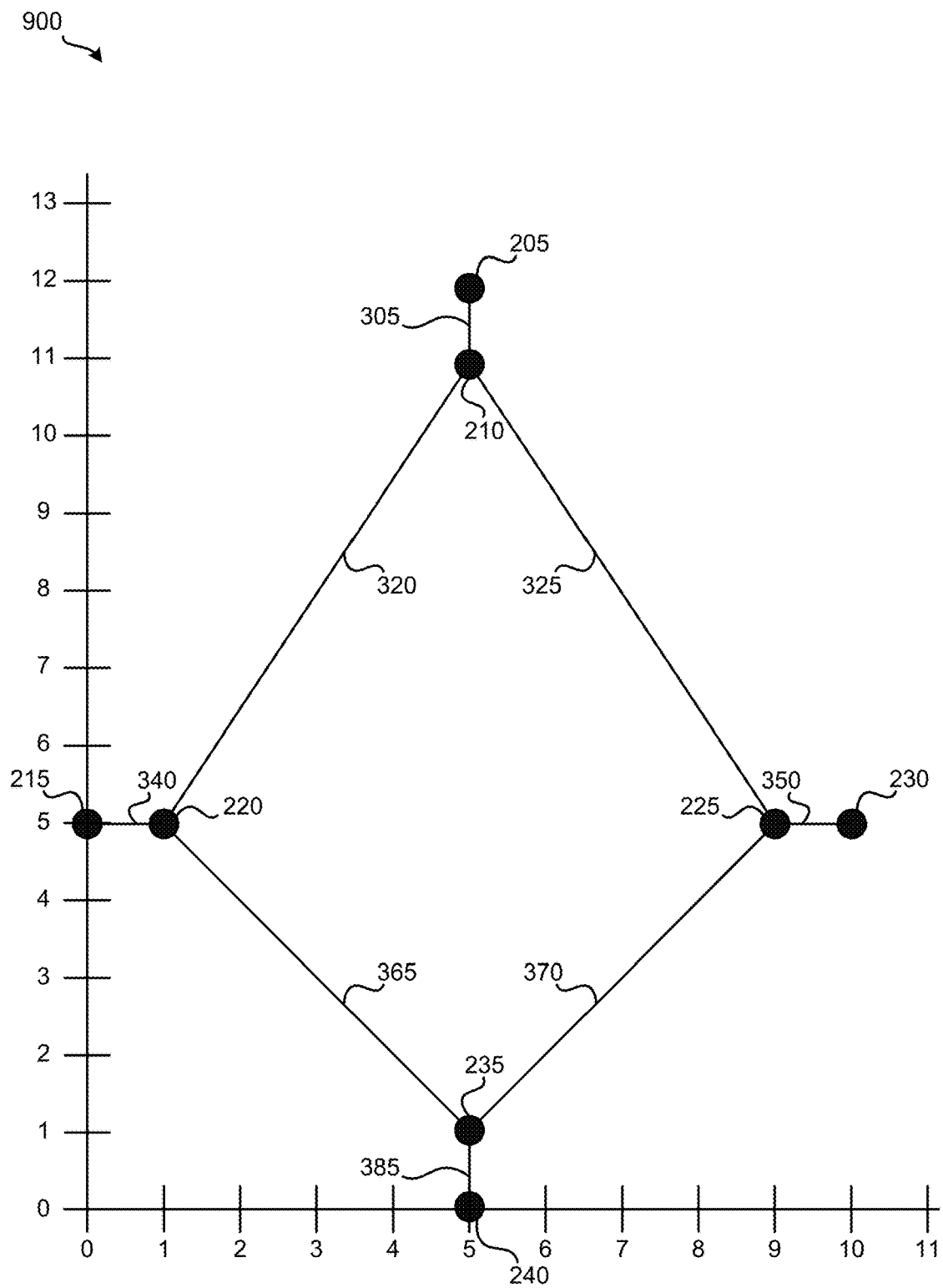
FIG. 9 illustrates an example alpha shape formed from the set of points illustrated in FIG. 2 according to some embodiments.

When alpha shape engine 130 receives the set of points 200 and the alpha value of 3.6 for the set of points 200 from alpha value manager 125, alpha shape engine 130 generates an alpha shape formed from the set of points 200 based on the alpha value. FIG. 9 illustrates an example alpha shape 900 formed from the set of points illustrated in FIG. 2 according to some embodiments. In particular, alpha shape 900 is the alpha shape that alpha shape engine 130 generated using the set of points 200 and the alpha value of 3.6. As shown, alpha shape 800 is formed by points 205-240 and edges 305, 320, 325, 340, 350, 365, 370, and 385.

Figure 10:
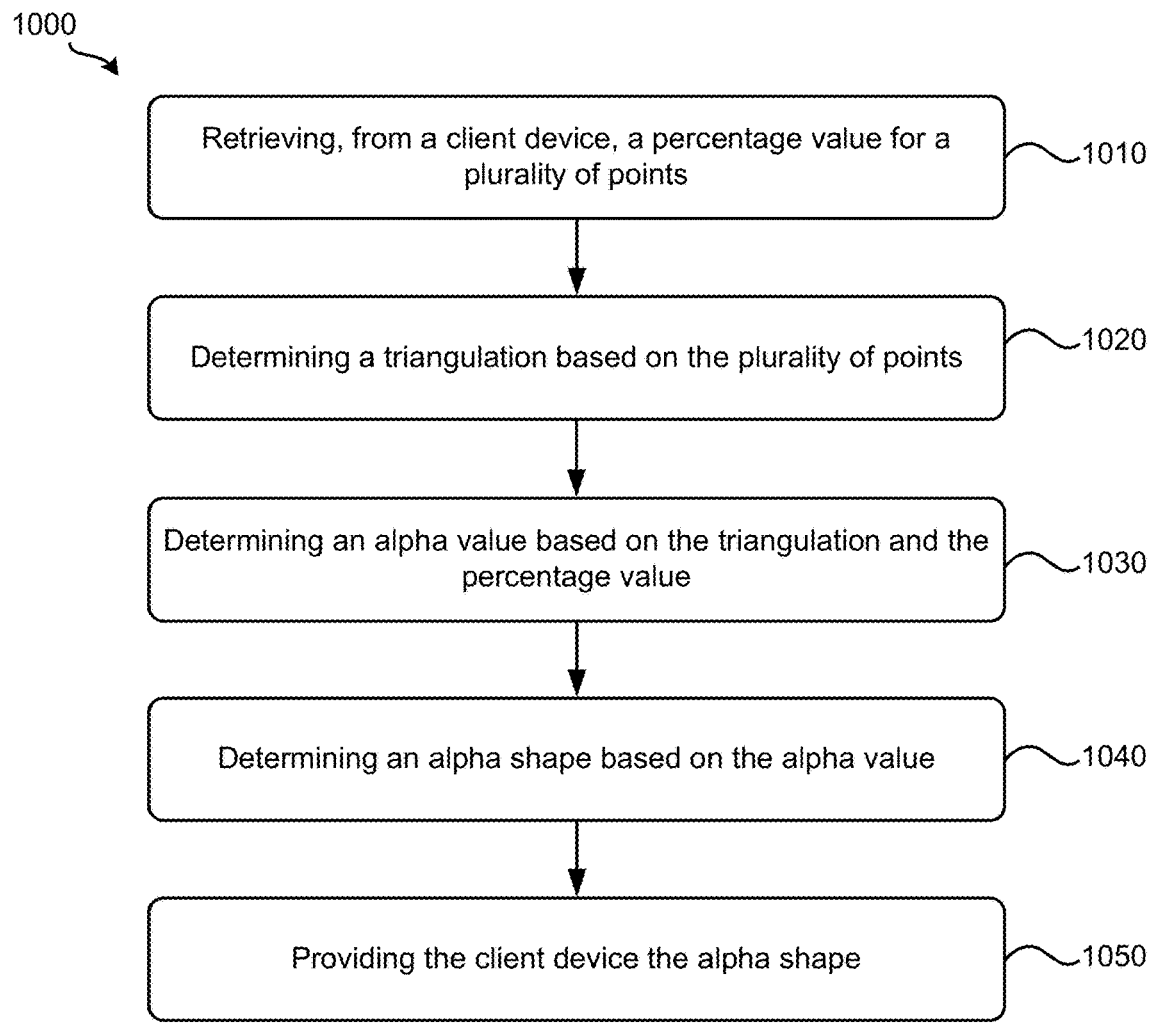
FIG. 10 illustrates a process for determining alpha shapes according to some embodiments.

FIG. 10 illustrates a process 1000 for determining alpha shapes according to some embodiments. In some embodiments, computing system 110 performs process 1000 in response to a request for an alpha shape for a set of points. Process 1000 starts by receiving, at 1010, from a client device, a percentage value for a set of points. Referring to FIG. 1 as an example, application 115 may receive a percentage value for a set points from client device 105. Once application 115 receives the percentage value, application 115 retrieves the set of points from point data storage 135 and sends triangulation manager 120 the percentage value and the set of points.

Next, process 1000 determines, ate 1020, a triangulation based on the set of points. Referring to FIGS. 1-3 as an example, triangulation manager 120 may receive the set of points 200 from application 115. In response, triangulation manager 120 generates triangulation 300 of the set of points 200. Then, triangulation manager 120 send the set of points 200, the triangulation 300, and the percentage value to alpha value manager 125.

Process 1000 then determines, at 1030, an alpha value based on the triangulation and the percentage value. Referring to FIGS. 1, 2, 3, 4A and 4B as an example, after receiving the set of points 200, the triangulation 300, and the percentage value from triangulation manager 120, alpha value manager 125 determines an alpha value using any of the method described above (i.e., determining the alpha value based on edges of the triangulation 300 and the percentage value or determining the alpha value based on areas of triangles in the triangulation 300 and the percentage value). Alpha value manager 125 then sends alpha shape engine 130 the set of points 200 and the alpha value.

Next, process 1000 determines, at 1040, an alpha shape based on the alpha value. Referring to FIGS. 1, 2, and 5 as an example, alpha shape engine 130 may receive the set of points 200 and the alpha value from alpha value manager 125. In response, alpha shape engine 130 generates alpha shape 500 based on the alpha value and sends the alpha shape to application 115. Finally, process 1000 provides, at 1050, the client device the alpha shape. Referring to FIGS. 1 and 5 as an example, when application 115 receives alpha shape 500 from alpha shape engine 130, application 115 forwards it to client device 105. Then, client device 105 presents (e.g., by displaying it on a display of client device 105) alpha shape 500.

Figure 11:
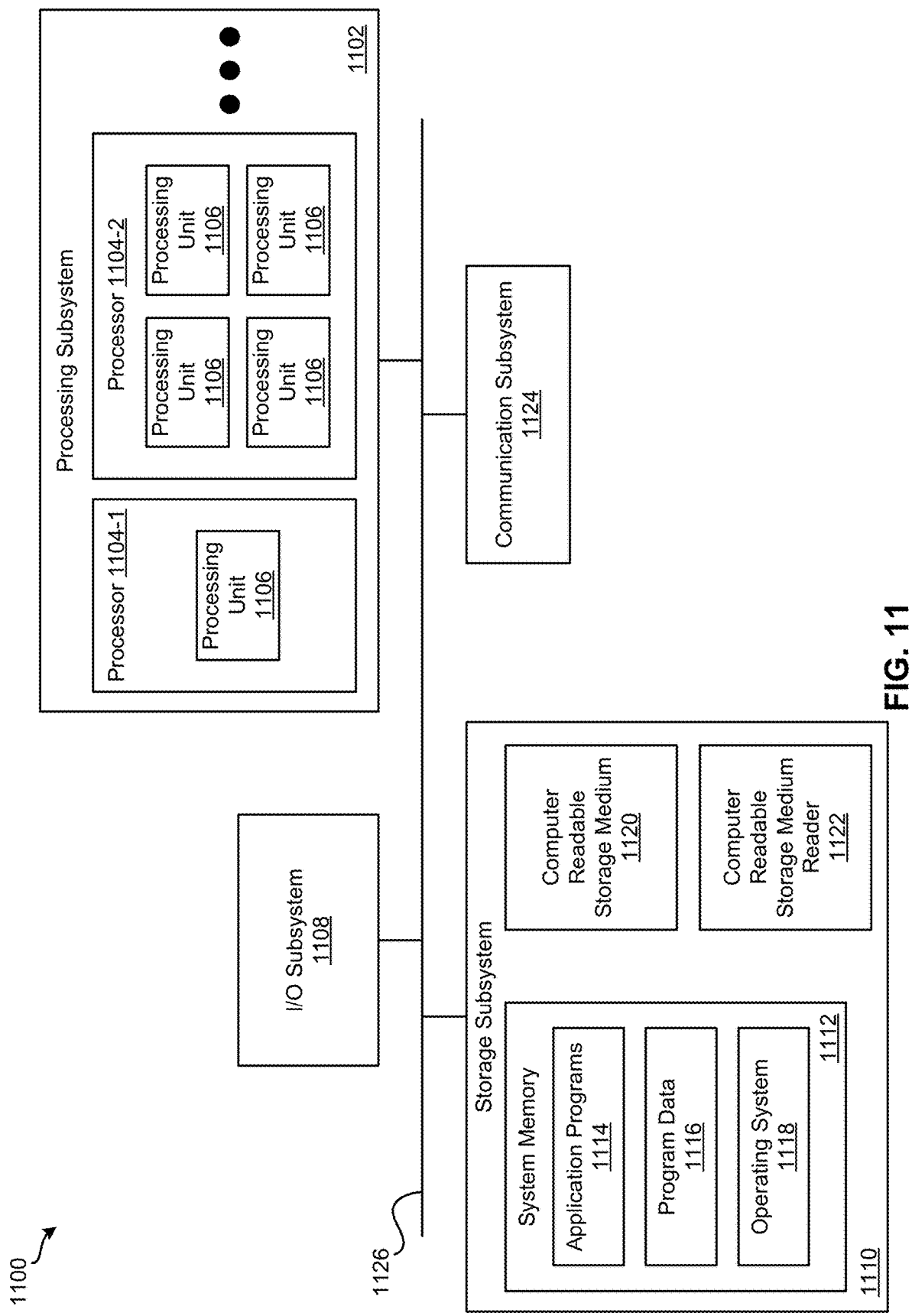
FIG. 11 illustrates an exemplary computer system, in which various embodiments may be implemented.

FIG. 11 illustrates an exemplary computer system 1100 for implementing various embodiments described above. For example, computer system 1100 may be used to implement computing system 110 and client device 105. Computer system 1100 may be a desktop computer, a laptop, a server computer, or any other type of computer system or combination thereof. Some or all elements of application 115, triangulation manager 120, alpha value manager 125, alpha shape engine 130, or combinations thereof can be included or implemented in computer system 1100. In addition, computer system 1100 can implement many of the operations, methods, and/or processes described above (e.g., process 1000). As shown in FIG. 11, computer system 1100 includes processing subsystem 1102, which communicates, via bus subsystem 1126, with input/output (I/O) subsystem 1108, storage subsystem 1110 and communication subsystem 1124.

Bus subsystem 1126 is configured to facilitate communication among the various components and subsystems of computer system 1100. While bus subsystem 1126 is illustrated in FIG. 11 as a single bus, one of ordinary skill in the art will understand that bus subsystem 1126 may be implemented as multiple buses. Bus subsystem 1126 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 1102, which can be implemented as one or more integrated circuits (e.g., a conventional microprocessor or microcontroller), controls the operation of computer system 1100. Processing subsystem 1102 may include one or more processors 1104. Each processor 1104 may include one processing unit 1106 (e.g., a single core processor such as processor 1104-1) or several processing units 1106 (e.g., a multicore processor such as processor 1104-2). In some embodiments, processors 1104 of processing subsystem 1102 may be implemented as independent processors while, in other embodiments, processors 1104 of processing subsystem 1102 may be implemented as multiple processors integrate into a single chip or multiple chips. Still, in some embodiments, processors 1104 of processing subsystem 1102 may be implemented as a combination of independent processors and multiple processors integrated into a single chip or multiple chips.

In some embodiments, processing subsystem 1102 can execute a variety of programs or processes in response to program code and can maintain multiple concurrently executing programs or processes. At any given time, some or all of the program code to be executed can reside in processing subsystem 1102 and/or in storage subsystem 1110. Through suitable programming, processing subsystem 1102 can provide various functionalities, such as the functionalities described above by reference to process 1000, etc.

I/O subsystem 1108 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 1100 to a user or another device (e.g., a printer).

As illustrated in FIG. 11, storage subsystem 1110 includes system memory 1112, computer-readable storage medium 1120, and computer-readable storage medium reader 1122. System memory 1112 may be configured to store software in the form of program instructions that are loadable and executable by processing subsystem 1102 as well as data generated during the execution of program instructions. In some embodiments, system memory 1112 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 1112 may include different types of memory, such as static random access memory (SRAM) and/or dynamic random access memory (DRAM). System memory 1112 may include a basic input/output system (BIOS), in some embodiments, that is configured to store basic routines to facilitate transferring information between elements within computer system 1100 (e.g., during start-up). Such a BIOS may be stored in ROM (e.g., a ROM chip), flash memory, or any other type of memory that may be configured to store the BIOS.

As shown in FIG. 11, system memory 1112 includes application programs 1114 (e.g., application 115), program data 1116, and operating system (OS) 1118. OS 1118 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 1120 may be a non-transitory computer-readable medium configured to store software (e.g., programs, code modules, data constructs, instructions, etc.). Many of the components (e.g., application 115, triangulation manager 120, alpha value manager 125, and alpha shape engine 130) and/or processes (e.g., process 1000) described above may be implemented as software that when executed by a processor or processing unit (e.g., a processor or processing unit of processing subsystem 1102) performs the operations of such components and/or processes. Storage subsystem 1110 may also store data used for, or generated during, the execution of the software.

Storage subsystem 1110 may also include computer-readable storage medium reader 1122 that is configured to communicate with computer-readable storage medium 1120. Together and, optionally, in combination with system memory 1112, computer-readable storage medium 1120 may comprehensively represent remote, local, fixed, and/or removable storage devices plus storage media for temporarily and/or more permanently containing, storing, transmitting, and retrieving computer-readable information.

Computer-readable storage medium 1120 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 1124 serves as an interface for receiving data from, and transmitting data to, other devices, computer systems, and networks. For example, communication subsystem 1124 may allow computer system 1100 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 1124 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 1124 may provide components configured for wired communication (e.g., Ethernet) in addition to or instead of components configured for wireless communication.

One of ordinary skill in the art will realize that the architecture shown in FIG. 11 is only an example architecture of computer system 1100, and that computer system 1100 may have additional or fewer components than shown, or a different configuration of components. The various components shown in FIG. 11 may be implemented in hardware, software, firmware or any combination thereof, including one or more signal processing and/or application specific integrated circuits.

Figure 12:
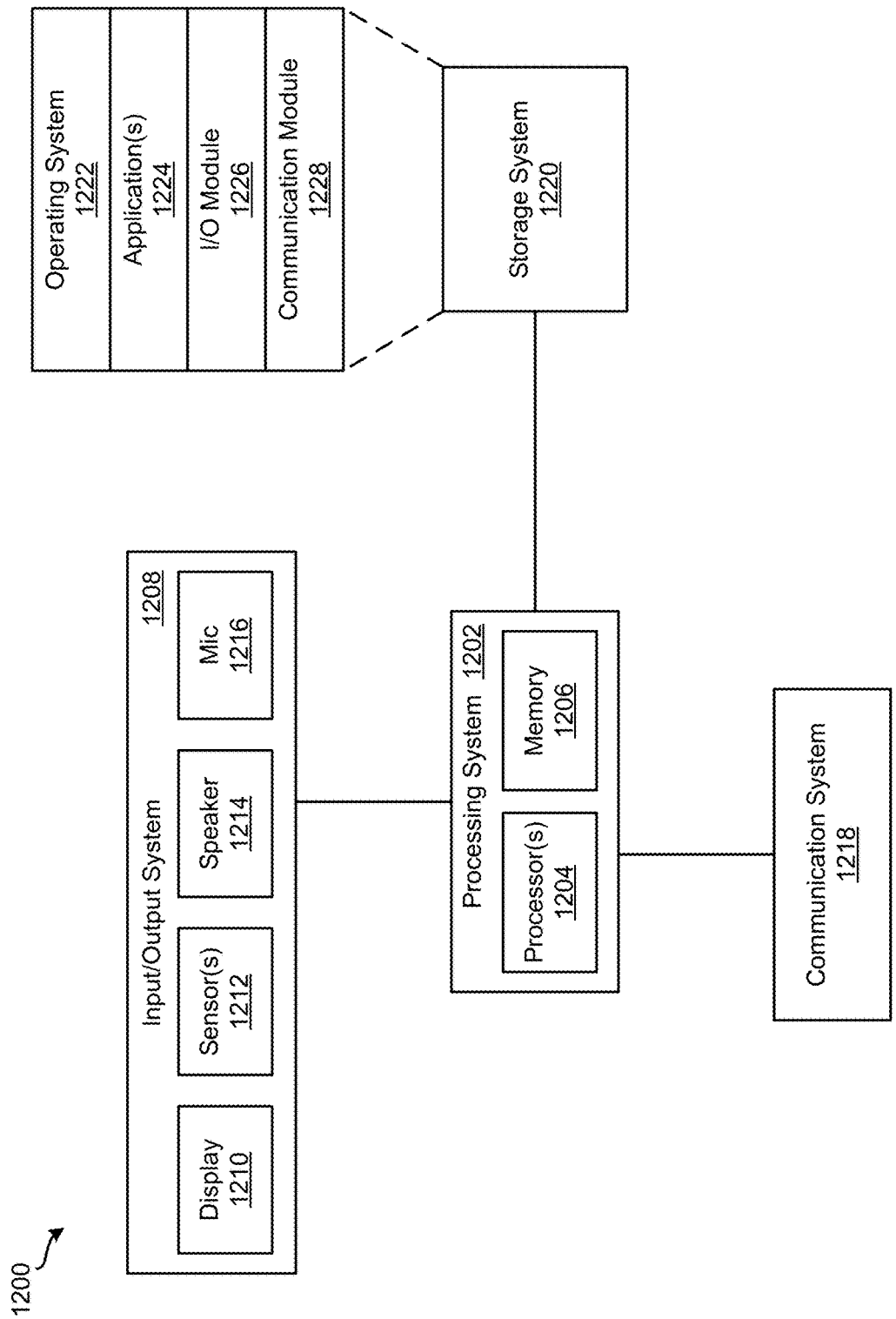
FIG. 12 illustrates an exemplary computing device, in which various embodiments may be implemented.

FIG. 12 illustrates an exemplary computing device 1200 for implementing various embodiments described above. For example, computing device 1200 may be used to implement client devices 105. Computing device 1200 may be a cellphone, a smartphone, a wearable device, an activity tracker or manager, a tablet, a personal digital assistant (PDA), a media player, or any other type of mobile computing device or combination thereof. As shown in FIG. 12, computing device 1200 includes processing system 1202, input/output (I/O) system 1208, communication system 1218, and storage system 1220. These components may be coupled by one or more communication buses or signal lines.

Processing system 1202, which can be implemented as one or more integrated circuits (e.g., a conventional microprocessor or microcontroller), controls the operation of computing device 1200. As shown, processing system 1202 includes one or more processors 1204 and memory 1206. Processors 1204 are configured to run or execute various software and/or sets of instructions stored in memory 1206 to perform various functions for computing device 1200 and to process data.

Each processor of processors 1204 may include one processing unit (e.g., a single core processor) or several processing units (e.g., a multicore processor). In some embodiments, processors 1204 of processing system 1202 may be implemented as independent processors while, in other embodiments, processors 1204 of processing system 1202 may be implemented as multiple processors integrate into a single chip. Still, in some embodiments, processors 1204 of processing system 1202 may be implemented as a combination of independent processors and multiple processors integrated into a single chip.

Memory 1206 may be configured to receive and store software (e.g., operating system 1222, applications 1224, I/O module 1226, communication module 1228, etc. from storage system 1220) in the form of program instructions that are loadable and executable by processors 1204 as well as data generated during the execution of program instructions. In some embodiments, memory 1206 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 1208 is responsible for receiving input through various components and providing output through various components. As shown for this example, I/O system 1208 includes display 1210, one or more sensors 1212, speaker 1214, and microphone 1216. Display 1210 is configured to output visual information (e.g., a graphical user interface (GUI) generated and/or rendered by processors 1204). In some embodiments, display 1210 is a touch screen that is configured to also receive touch-based input. Display 1210 may be implemented using liquid crystal display (LCD) technology, light-emitting diode (LED) technology, organic LED (OLED) technology, organic electro luminescence (OEL) technology, or any other type of display technologies. Sensors 1212 may include any number of different types of sensors for measuring a physical quantity (e.g., temperature, force, pressure, acceleration, orientation, light, radiation, etc.). Speaker 1214 is configured to output audio information and microphone 1216 is configured to receive audio input. One of ordinary skill in the art will appreciate that I/O system 1208 may include any number of additional, fewer, and/or different components. For instance, I/O system 1208 may include a keypad or keyboard for receiving input, a port for transmitting data, receiving data and/or power, and/or communicating with another device or component, an image capture component for capturing photos and/or videos, etc.

Communication system 1218 serves as an interface for receiving data from, and transmitting data to, other devices, computer systems, and networks. For example, communication system 1218 may allow computing device 1200 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 1218 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication system 1218 may provide components configured for wired communication (e.g., Ethernet) in addition to or instead of components configured for wireless communication.

Storage system 1220 handles the storage and management of data for computing device 1200. Storage system 1220 may be implemented by one or more non-transitory machine-readable mediums that are configured to store software (e.g., programs, code modules, data constructs, instructions, etc.) and store data used for, or generated during, the execution of the software.

In this example, storage system 1220 includes operating system 1222, one or more applications 1224, I/O module 1226, and communication module 1228. Operating system 1222 includes various procedures, sets of instructions, software components and/or drivers for controlling and managing general system tasks (e.g., memory management, storage device control, power management, etc.) and facilitates communication between various hardware and software components. Operating system 1222 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Applications 1224 can include any number of different applications installed on computing device 1200. Examples of such applications may include a browser application, an address book application, a contact list application, an email application, an instant messaging application, a word processing application, JAVA-enabled applications, an encryption application, a digital rights management application, a voice recognition application, location determination application, a mapping application, a music player application, etc.

I/O module 1226 manages information received via input components (e.g., display 1210, sensors 1212, and microphone 1216) and information to be outputted via output components (e.g., display 1210 and speaker 1214). Communication module 1228 facilitates communication with other devices via communication system 1218 and includes various software components for handling data received from communication system 1218.

One of ordinary skill in the art will realize that the architecture shown in FIG. 12 is only an example architecture of computing device 1200, and that computing device 1200 may have additional or fewer components than shown, or a different configuration of components. The various components shown in FIG. 12 may be implemented in hardware, software, firmware or any combination thereof, including one or more signal processing and/or application specific integrated circuits.

Figure 13:
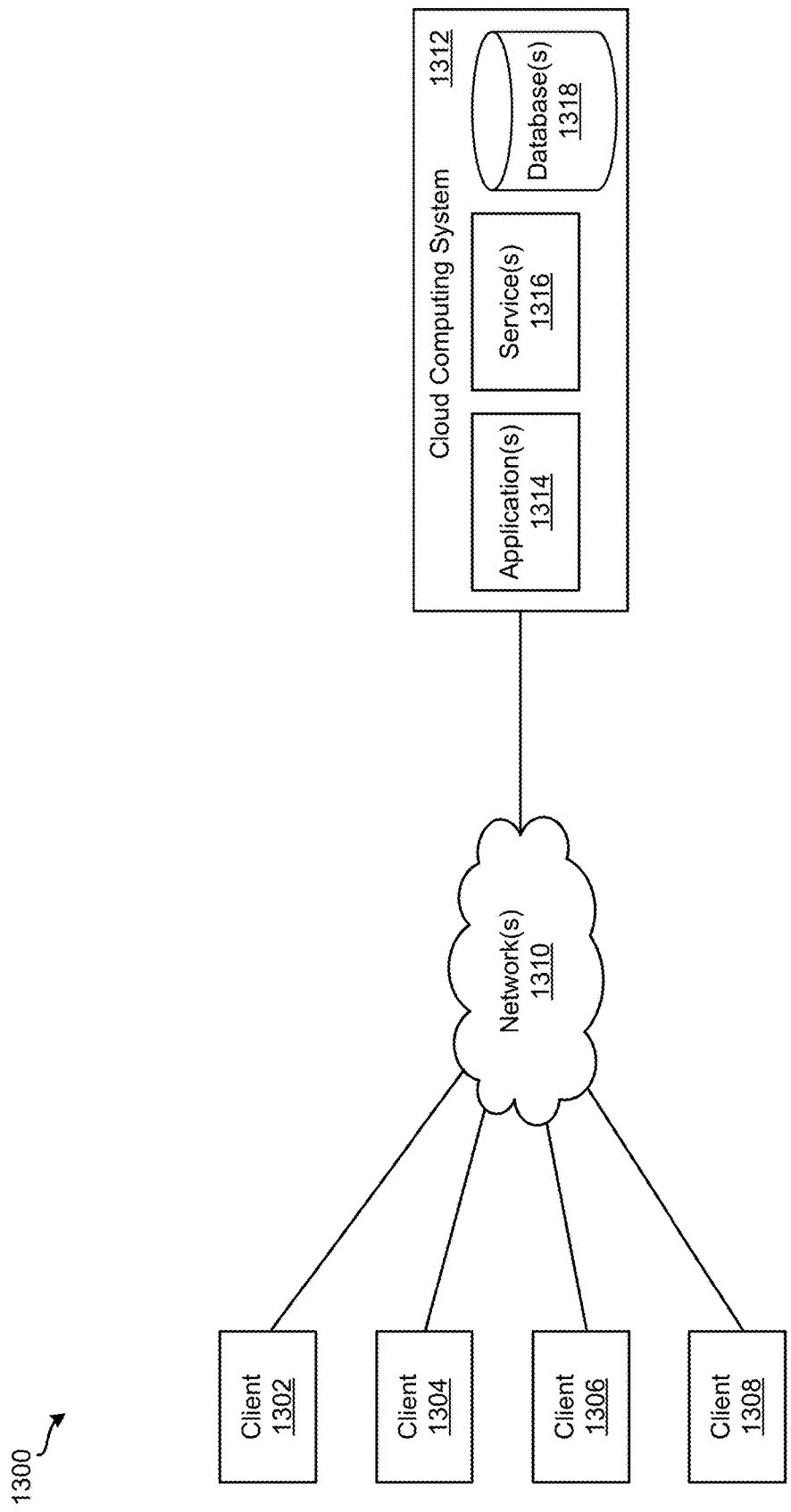
FIG. 13 illustrates system for implementing various embodiments described above.

FIG. 13 illustrates an exemplary system 1300 for implementing various embodiments described above. For example, one of the client devices 1302-1308 may be used to implement client device 105 and cloud computing system 1312 of system 1300 may be used to implement computing system 110. As shown, system 1300 includes client devices 1302-1308, one or more networks 1310, and cloud computing system 1312. Cloud computing system 1312 is configured to provide resources and data to client devices 1302-1308 via networks 1310. In some embodiments, cloud computing system 1300 provides resources to any number of different users (e.g., customers, tenants, organizations, etc.). Cloud computing system 1312 may be implemented by one or more computer systems (e.g., servers), virtual machines operating on a computer system, or a combination thereof.

As shown, cloud computing system 1312 includes one or more applications 1314, one or more services 1316, and one or more databases 1318. Cloud computing system 1300 may provide applications 1314, services 1316, and databases 1318 to any number of different customers in a self-service, subscription-based, elastically scalable, reliable, highly available, and secure manner.

In some embodiments, cloud computing system 1300 may be adapted to automatically provision, manage, and track a customer's subscriptions to services offered by cloud computing system 1300. Cloud computing system 1300 may provide cloud services via different deployment models. For example, cloud services may be provided under a public cloud model in which cloud computing system 1300 is owned by an organization selling cloud services and the cloud services are made available to the general public or different industry enterprises. As another example, cloud services may be provided under a private cloud model in which cloud computing system 1300 is operated solely for a single organization and may provide cloud services for one or more entities within the organization. The cloud services may also be provided under a community cloud model in which cloud computing system 1300 and the cloud services provided by cloud computing system 1300 are shared by several organizations in a related community. The cloud services may also be provided under a hybrid cloud model, which is a combination of two or more of the aforementioned different models.

In some instances, any one of applications 1314, services 1316, and databases 1318 made available to client devices 1302-1308 via networks 1310 from cloud computing system 1300 is referred to as a "cloud service." Typically, servers and systems that make up cloud computing system 1300 are different from the on-premises servers and systems of a customer. For example, cloud computing system 1300 may host an application and a user of one of client devices 1302-1308 may order and use the application via networks 1310.

Applications 1314 may include software applications that are configured to execute on cloud computing system 1312 (e.g., a computer system or a virtual machine operating on a computer system) and be accessed, controlled, managed, etc. via client devices 1302-1308. In some embodiments, applications 1314 may include server applications and/or mid-tier applications (e.g., HTTP (hypertext transport protocol) server applications, FTP (file transfer protocol) server applications, CGI (common gateway interface) server applications, JAVA server applications, etc.). Services 1316 are software components, modules, application, etc. that are configured to execute on cloud computing system 1312 and provide functionalities to client devices 1302-1308 via networks 1310. Services 1316 may be web-based services or on-demand cloud services.

Databases 1318 are configured to store and/or manage data that is accessed by applications 1314, services 1316, and/or client devices 1302-1308. For instance, point data storage 135 may be stored in databases 1318. Databases 1318 may reside on a non-transitory storage medium local to (and/or resident in) cloud computing system 1312, in a storage-area network (SAN), on a non-transitory storage medium local located remotely from cloud computing system 1312. In some embodiments, databases 1318 may include relational databases that are managed by a relational database management system (RDBMS). Databases 1318 may be a column-oriented databases, row-oriented databases, or a combination thereof. In some embodiments, some or all of databases 1318 are in-memory databases. That is, in some such embodiments, data for databases 1318 are stored and managed in memory (e.g., random access memory (RAM)).

Client devices 1302-1308 are configured to execute and operate a client application (e.g., a web browser, a proprietary client application, etc.) that communicates with applications 1314, services 1316, and/or databases 1318 via networks 1310. This way, client devices 1302-1308 may access the various functionalities provided by applications 1314, services 1316, and databases 1318 while applications 1314, services 1316, and databases 1318 are operating (e.g., hosted) on cloud computing system 1300. Client devices 1302-1308 may be computer system 1100 or computing device 1200, as described above by reference to FIGS. 11 and 12, respectively. Although system 1300 is shown with four client devices, any number of client devices may be supported.

Networks 1310 may be any type of network configured to facilitate data communications among client devices 1302-1308 and cloud computing system 1312 using any of a variety of network protocols. Networks 1310 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A non-transitory machine-readable medium storing a program executable by at least one processing unit of a device, the program comprising sets of instructions for:
   receiving, from a client device, a percentage value for a set of points;
   determining a triangulation based on the set of points;
   determining an alpha value based on the triangulation and the percentage value by determining a list of edges comprising each edge in the triangulation, determining a length for each edge in the list of edges; and sorting the list of edges from shortest length to longest length;
   determining an alpha shape based on the alpha value; and
   providing the client device the alpha shape.

2. The non-transitory machine-readable medium of claim 1, wherein determining the alpha value further comprises:
   calculating a value based on the percentage value and a total number of edges in the list of edges;
   identifying an edge in the list of edges having an nth shortest length, wherein n equals the value; and
   determining the alpha value by dividing the length of the identified edge by a defined value.

3. The non-transitory machine-readable medium of claim 2, wherein calculating the value comprises determining an integer closest to the product of the percentage value and the total number of edges in the list of edges.

4. The non-transitory machine-readable medium of claim 1, wherein determining the alpha shape based on the alpha value comprises:
   generating a circle having a radius equal to the alpha value; and
   iterating through each pair of points in the set of points to identify a set of edges configured to define the alpha shape by including in the set of edges each edge formed by a pair of points in the set of points where the circle can be positioned to touch the pair of points without the circle enclosing any other points in the set of points.

5. The non-transitory machine-readable medium of claim 4, wherein the program further comprises a set of instructions for determining, for each triangle in the triangulation, whether to include edges of the triangle in the set of edges configured to define the alpha shape based on a circumcircle of the triangle and the generated circle.

6. The non-transitory machine-readable medium of claim 1, wherein the triangulation is a Delaunay triangulation.

7. The non-transitory machine-readable medium of claim 1, wherein an application operating on the device is configured to receive the percentage value for the set of points from the client device and provide the alpha shape to the client device.

8. For a device, a method comprising:
   receiving, from a client device, a percentage value for a set of points;
   determining a triangulation based on the set of points;
   determining an alpha value based on the triangulation and the percentage value by determining a list of edges comprising each edge in the triangulation, determining a length for each edge in the list of edges; and sorting the list of edges from shortest length to longest length;
   determining an alpha shape based on the alpha value; and
   providing the client device the alpha shape.

9. The method of claim 8, wherein determining the alpha value further comprises:
   calculating a value based on the percentage value and a total number of edges in the list of edges;
   identifying an edge in the list of edges having an $n^{th}$ shortest length, wherein n equals the value; and
   determining the alpha value by dividing the length of the identified edge by a defined value.

10. The method of claim 9, wherein calculating the value comprises determining an integer closest to the product of the percentage value and the total number of edges in the list of edges.

11. The method of claim 8, wherein determining the alpha shape based on the alpha value comprises:
   generating a circle having a radius equal to the alpha value; and
   iterating through each pair of points in the set of points to identify a set of edges configured to define the alpha shape by including in the set of edges each edge formed by a pair of points in the set of points where the circle can be positioned to touch the pair of points without the circle enclosing any other points in the set of points.

12. The method of claim 11 further comprising determining, for each triangle in the triangulation, whether to include edges of the triangle in the set of edges configured to define the alpha shape based on a circumcircle of the triangle and the generated circle.

13. The method of claim 8 further comprising wherein the triangulation is a Delaunay triangulation.

14. The method of claim 8, wherein an application operating on the device is configured to receive the percentage value for the set of points from the client device and provide the alpha shape to the client device.

15. A system comprising:
   a set of processing units; and
   a non-transitory machine-readable medium storing instructions that when executed by at least one processing unit in the set of processing units cause the at least one processing unit to:
   receive, from a client device, a percentage value for a set of points;
   determine a triangulation based on the set of points;
   determine an alpha value based on the triangulation and the percentage value by determining a list of edges comprising each edge in the triangulation, determining a length for each edge in the list of edges; and sorting the list of edges from shortest length to longest length;
   determine an alpha shape based on the alpha value; and
   provide the client device the alpha shape.

16. The system of claim 15, wherein determining the alpha value further comprises:
   calculating a value based on the percentage value and a total number of edges in the list of edges;
   identifying an edge in the list of edges having an $n^{th}$ shortest length, wherein n equals the value; and
   determining the alpha value by dividing the length of the identified edge by a defined value.

17. The system of claim 16, wherein calculating the value comprises determining an integer closest to the product of the percentage value and the total number of edges in the list of edges.

18. The system of claim 15, wherein the triangulation is a Delaunay triangulation.

19. The system of claim 15, wherein an application operating on the system is configured to receive the percentage value for the set of points from the client device and provide the alpha shape to the client device.

20. The system of claim 15, wherein determining the alpha shape based on the alpha value comprises:
   generating a circle having a radius equal to the alpha value; and
   iterating through each pair of points in the set of points to identify a set of edges configured to define the alpha shape by including in the set of edges each edge formed by a pair of points in the set of points where the circle can be positioned to touch the pair of points without the circle enclosing any other points in the set of points.

* * * * *